United States Patent [19]

Hoflich et al.

[11] Patent Number: 4,731,750

[45] Date of Patent: Mar. 15, 1988

[54] WORKSTATION RESOURCE SHARING

[75] Inventors: Martha A. Hoflich, Tokyo, Japan; Jack E. Olson, Austin, Tex.

[73] Assignee: International Business Machines Corporation, Armonk, N.Y.

[21] Appl. No.: 568,007

[22] Filed: Jan. 4, 1984

[51] Int. Cl.[4] .................... G06F 13/00; G06F 15/16
[52] U.S. Cl. ........................................ 364/900; 370/86
[58] Field of Search ... 364/200 MS File, 900 MS File; 370/79, 86; 340/825.52, 825.05, 825.54

[56] References Cited

U.S. PATENT DOCUMENTS

| | | | |
|---|---|---|---|
| 3,618,045 | 11/1971 | Campbell | 364/200 |
| 3,707,725 | 12/1972 | Dellheim | 364/200 |
| 3,792,447 | 2/1974 | Beltz et al. | 364/200 |
| 4,145,739 | 3/1979 | Dunning | 364/200 |
| 4,413,328 | 11/1983 | Videki, Jr. | 364/900 |
| 4,435,766 | 3/1984 | Haber | 364/300 |
| 4,439,781 | 3/1984 | Yano | 346/153.1 |
| 4,458,331 | 7/1984 | Amezcua | 364/900 |
| 4,517,637 | 5/1985 | Cassell | 364/138 |
| 4,525,806 | 6/1985 | Barnes | 364/900 |
| 4,545,015 | 10/1985 | Baunach | 364/200 |
| 4,553,202 | 11/1985 | Trufyn | 364/200 |
| 4,574,284 | 3/1986 | Feldman et al. | 340/825.52 |
| 4,633,430 | 12/1986 | Cooper | 364/900 |

FOREIGN PATENT DOCUMENTS

82/02965  9/1982  PCT Int'l Appl.
2023314  12/1979  United Kingdom.

Primary Examiner—Archie E. Williams, Jr.
Attorney, Agent, or Firm—Douglas H. Lefeve

[57] ABSTRACT

A system allows a workstation to utilize the resources of another workstation without requiring the presence of an operator on the second workstation. These resources can include memory and processor cycles, and I/O devices including disk, diskette, printer, and communications ports. When an operator is present at the second workstations, resources in excess of those required at the second workstation can also be used by a first workstation. Messages are displayed on the display of the second workstation warning that resources there are being utilized to prevent inadvertent powering off of the second workstation. In addition, jobs may be automatically started at the second workstation when the workstation is powered on, without requiring any additional action or logging on by the operator.

9 Claims, 4 Drawing Figures

WORKSTATION RESOURCE SHARING

DESCRIPTION

1. Technical Field

This invention relates generally to the sharing of resources associated with intelligent workstations in data processing systems, and more specifically to a technique for utilizing available workstation resorces without requiring the knowledge or presence of an operator associated with certain ones of the workstations having resources which are utilized.

2. Background Art (Prior Art Statement)

In data processing systems a traditional technique of utilizing system resources has been to provide a central, host computer having a rather large random access memory and one or more storage devices such as flexible diskettes or hard disk files, as well as one or more printers. Operator input to the system for entering data and supplying updating data as well as commands to request that the desired data processing operations take place has often been through remotely connected workstations. Typically, such a workstation consisted of a keyboard and cathode ray tube display combination. Necessary electronics were associated with these workstation components to enable the display of the keyed data on the CRT screen and also to enable two-way communication of the keyed data to the central computer and from the central computer back to the CRT screen. It is important to note, however, that very little, if any, data processing took place at the workstation itself. Instead, data and task commands were communicated from the workstation back to the central computer where the data processing took place. The results of this data processing were then communicated back to the workstation and, possibly, also to a printer or storage device directly attached to the central computer. Such a printer may have been, alternatively, associated with the workstation.

As the evolution of computer technology has led to more compact and lower cost data processing components, including, in particular, processors, random access memories, and disk storage devices, there has been a trend to include more and more of these components at the workstation location. Thus, workstations including processors, random access memory, magnetic media storage (and possibly a printer) are referred to as intelligent workstations and are capable of performing some of the data processing tasks at the workstations without utilizing the central computer for all processing capability.

In some data processing configurations, for example, those primarily configured to do text processing tasks and secondarily utilized for numerical processing tasks, the trend toward the use of intelligent workstations has evolved to the point that the central computer performs only a limited amount of data processing and serves primarily to control the sharing of its storage and printer resources, while the primary data processing capability resides at the workstations. Such an arrangement, nevertheless, provides a great deal of communications capability between workstations.

The change from large, centralized data processing systems with non-intelligent terminals to systems employing clusters of distributed intelligent workstations has resulted in inefficient use of resources such as processors, memory, storage files and I/O devices because of the limited ability of one intelligent workstation to share resources with another intelligent workstation. With the appearance of local area networks a limited amount of sharing capability is now available. However, with intelligent workstations a significant challenge is still present with regard to the effective utilization of computer resources such as the processing capability and random access memory and file storage available in intelligent workstations throughout an establishment.

SUMMARY OF THE INVENTION

A technique is provided to effectively utilize the resources of a workstation without requiring an operator to be present at that workstation. Additionally, resources of a workstation can be shared with other workstations even if an operator is actively using the workstation containing the resources to be shared, when it is determined that the workstation has excess resources beyond those needed by the applications being invoked by the operator.

More particularly this invention allows an operator at a first workstation to cause a queue of jobs to be started at a second workstation if no operator is actively using (logged onto) the second workstation. Additionally, if an operator is logged onto the second workstation, resources beyond those needed for the jobs being processed by the operator on the second workstation can be utilized by the operator of the first workstation. Messages are displayed on the screen of the second workstation to warn anyone who might power off the machine that jobs are running on that workstation, even though it may be the case that no operator is logged onto the second workstation.

With this technique a queue of jobs waiting for resources to process the queue can be automatically started when the system identifies a powered on workstation having the resources needed to run the queue before an operator is logged onto that workstation.

The foregoing and other objects, features, extensions, and advantages of the invention will be apparent from the following more particularly description of preferred embodiments of the invention, as illustrated in the accompanying drawing.

BRIEF DESCRIPTION OF THE DRAWINGS

FIG. 1 is a flow diagram showing the logic required when a workstation is powered on.

DESCRIPTION OF THE PREFERRED EMBODIMENTS

Figure 4:
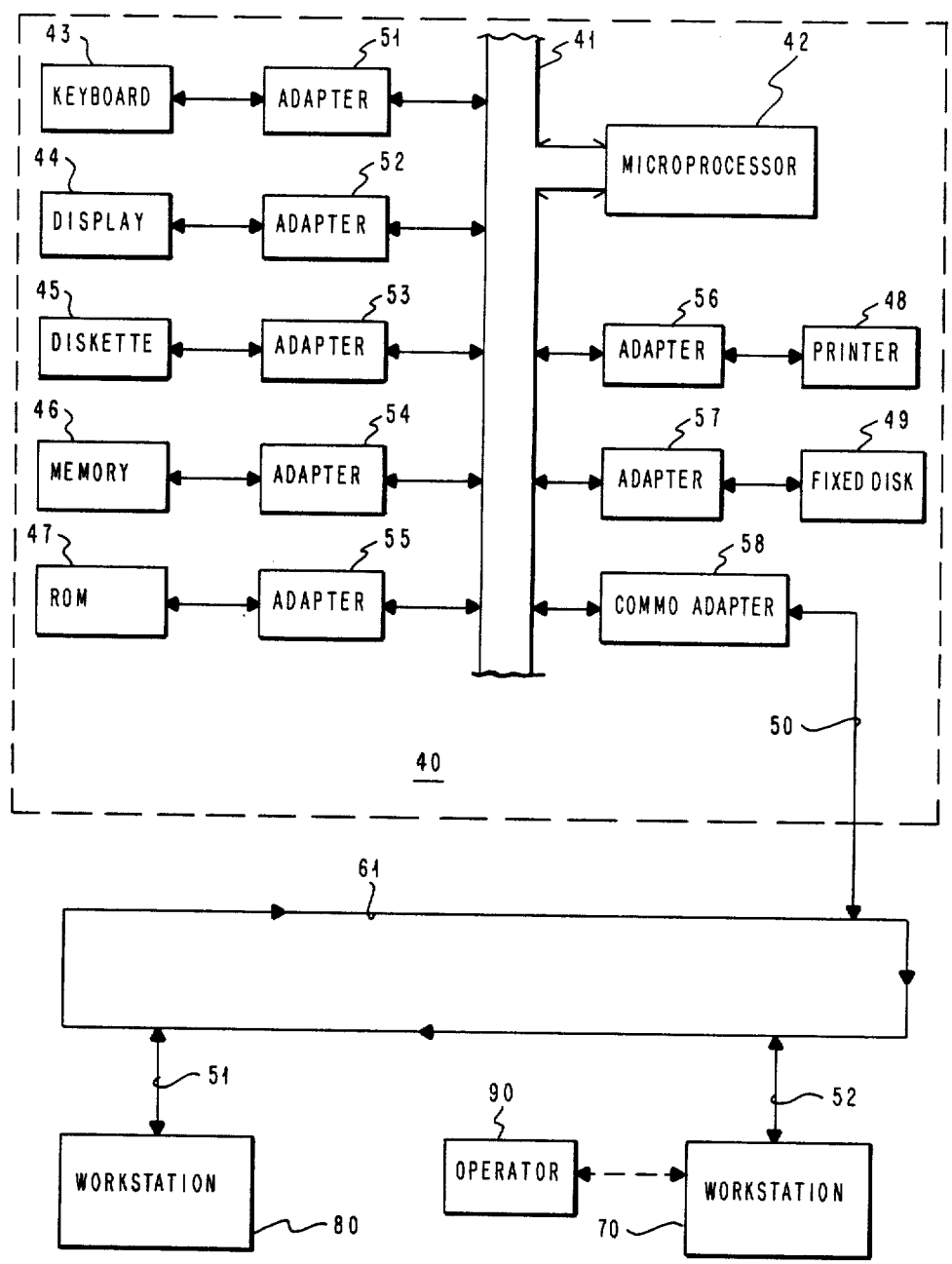
FIG. 4 is a system diagram of the operating environment of this invention.

For a description of the operating environment of this invention reference is made to the system diagram of FIG. 4. This drawing figure shows only prior art hardware elements which were available and connected as shown prior to the filing of this application. For example, see U.S. patent applications, Ser. Nos. 292,081 and 292,070, both filed Aug. 12, 1981, now U.S. Pat. Nos. 4,437,093 and 4,460,957, respectively, both assigned to the assignee of this application, which show configurations including elements such as those described hereinafter which are similarly connected.

Workstations 40, 70 and 80 are connected to a communications link 61. The communications link is shown as a ring in this example, although other forms of communications such as the star or multi-drop configurations are well known to those skilled in the art and may be used with this invention in place of the ring shown here. Each of the workstations 40, 70 and 80 may comprise, for example, the IBM Personal Computer XT or any number of other terminals with input/output devices well known to those skilled in the art. The workstation 40 is shown in more detail as an example of the architecture that any of the workstations may take, although it is important to note that it is not necessary that the workstations be alike, but simply that the workstations include resources beyond those always necessary to do some of the types of jobs that they are called upon to do. Workstation 40 comprises a microprocessor which may, for example, be an Intel 8088 microprocessor. Microprocessor 42 is connected to a data/address/control bus 41. A keyboard 43, a display 44, a diskette drive 45, a memory 46, a read-only memory 47, a printer 48, and a fixed disk storage 49 are connected to the bus 41 through adapters 51–57, respectively. Additionally, a communications adapter 58 is also connected to the bus 41 and this communications adapter is connected to the communications link 61 through a cable 50. Similarly, cables 51 and 52 connect workstations 80 and 70, respectively, to the communications link 61. Element 90 in FIG. 4 denotes an operator which may log a workstation, such as workstation 70, onto the communications link 61 for active use of other resources connected to the link 61, as explained hereinafter.

Each of the elements of workstation 40 are prior art devices available from the International Business Machines Corporation in association with the IBM Personal Computer XT. Some of the devices such as the diskette drive 45, memory 46, and read-only memory 47 and adapters 53–55 therefore are included with the computer as purchased, although additional memory may be added by the purchaser. Other ones of the devices and adapters, such as the display 44, printer 48 and adapters 52 and 56, respectively, may be purchased separately from the International Business Machines Corporation for installation in the computer.

Within the read-only memory 47 are stored a plurality of instructions, known as the basic input/output operating system, or BIOS, for execution by the microprocessor 42. The BIOS controls the fundamental operations of the computer. An operating system is loaded into the memory 46 and runs in conjunction with the BIOS stored in the read-only memory 47. Accordingly, in view of FIG. 4, those skilled in the art will readily understand that the workstations connected to the communications link 61 may typically include a number of devices, the use of which would be greatly advantageous to the other workstations when those devices are not presently needed to their fullest extent at the workstation to which they are directly attached.

Figure 1:
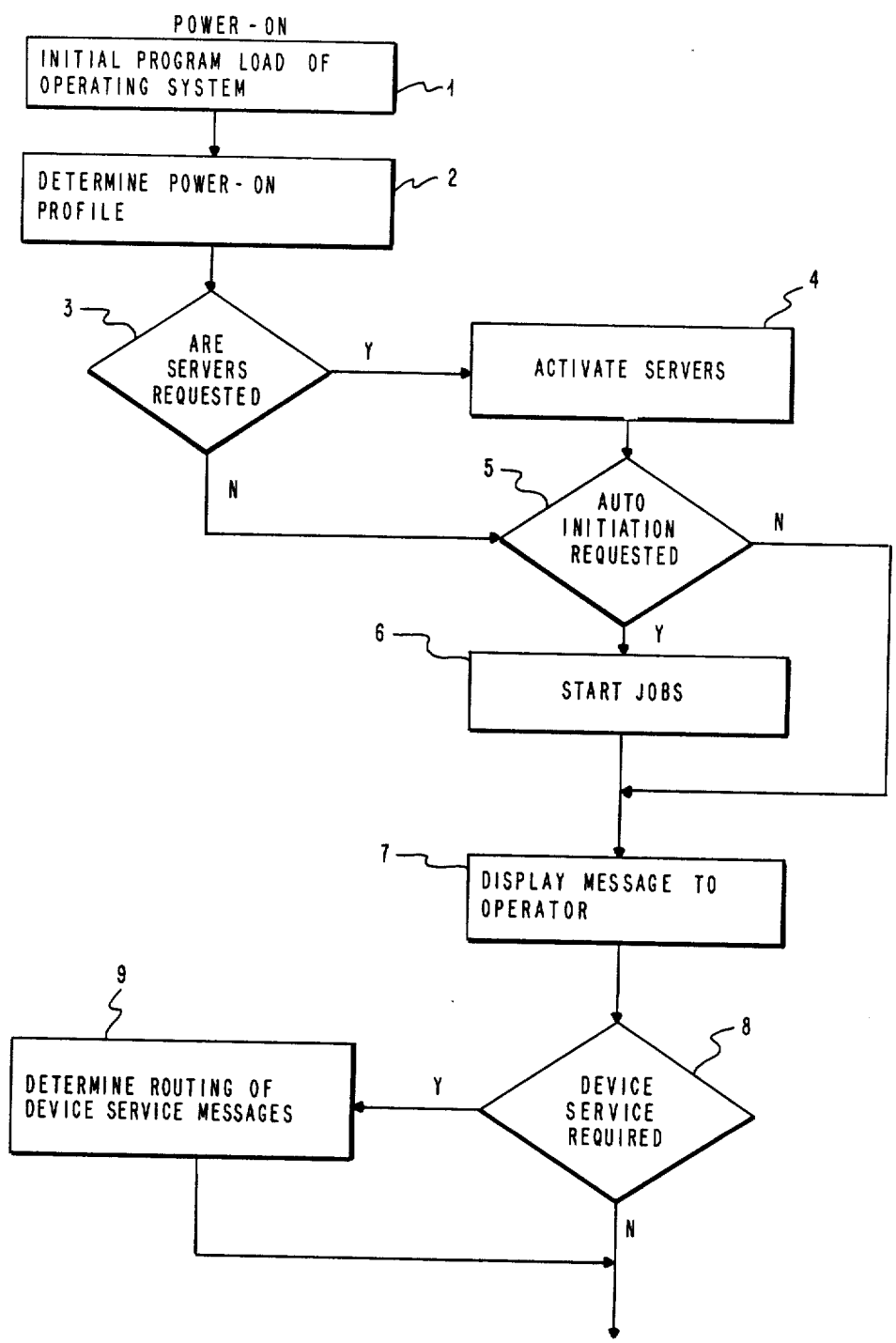

For a detailed description of the invention, reference is first made to FIG. 1. This figure shows the logical steps executed when a workstation is powered on. The first step at block 1 is the initial program load of the operating system. Any necessary hardware diagnostics are performed during this step and after the initial program load the operating system takes over management of the workstation.

Next, at block 2 the operating system determines which profile is to be executed at power on. This profile can contain many specifications required for system operation. Only those specifications which are relevant to this invention are discussed in the present context, such as servers to be started, jobs to be automatically initiated, and devices or memory to be reserved for the interactive user.

For the purposes of this description a server is a program or portion of a program which allows an application such as printing or storing and retrieving from a file to take place. Additionally, the server software includes a queuing function capable of taking a request to execute the application, knowing where the request came from, starting the application when able and sending a reply back to the requester when the application is complete or when it is clear that the application cannot be completed. This additional function of the server is automatic and non-interactive, as is well known to those skilled in the art.

Additionally for this description workstation resources which may be shared include, but are not limited to memory and processor cycles and I/O devices including disks, diskettes, printers, and communications ports.

Next, at block 3 the operating system checks to see if any servers are to be started. If so, at block 4 servers are activated. This allows for sharing of the allowable excess resources specified to be shared, without requiring an operator to be present on the server workstation to initiate the server. More specifically, a printer can be made available for use by any other workstation. The server to which the printer is connected will accept requests for service from other workstations on a local area network to which the server for the printer is connected, from a teleprocessing line to which the server is connected, as well as locally. All requests are handled the same regardless of their origin. Requests from any of the sources can be serviced without the presence of an operator at the server workstation.

After the servers are activated (if any were requested), at block 5 the operating system then checks to see if any jobs are specified for auto-initiation. This is particularly useful for communications jobs. An electronic mail application, for example, may be started at block 6. This application can request all mail be delivered so that when the users log onto the system the desired mail will already be available. Job initiation requests can subsequently be received from workstations on the local area network, from the teleprocessing line, as well as locally. Again, all requests are handled the same regardless of their origin.

In addition to initiating a job at power on, jobs may be initiated at a particular time of day. This allows batch type jobs to be run at night when no operator is present. For example, an inventory update can be run after all of the day's input has been received. Then the inventory master file can be backed up on a diskette.

A third specification in the power on profile is that of the workstation resources reserved for an interactive user of the workstation if and when a user logs onto that workstation. This parameter specifies how much memory and/or what devices are not to be shared with other workstations. This ensures that an interactive user can always log onto his or her assigned workstation and perform his or her work. In other words, the workstation's resources cannot be shared by other workstations to the extent that the workstation becomes unusable to the interactive user. Thus, at block 7 a message is displayed at a second workstation having resources utilized by a first workstation, whether or not an operator is logged onto the second workstation. The message will instruct anyone at the second workstation not to turn off that workstation. The message will also indicate whether or not an operator is logged onto the second workstation.

Some devices which may be shared, in particular, a printer (and less frequently, diskette drives), may require service or operator attention when in use. At block 8 as long as no device service is required the jobs are executed as described above. In the event it is necessary to post a message regarding required device service, at block 9 a profile associated with each server is addressed which specifies the device service message routing. This profile may specify, but is not limited to, the workstation that owns the resource, the user that initiated the job, a particular user, or broadcast to all powered on workstations. More than one option may be specified. If the first option does not provide service for the device, the second and succeeding options will be tried until all options are exhausted. The operating system then returns to the first option in a continuing attempt to communicate to an appropriate operator the requirement for device service. It is important to note that the message routing routine is responsive to whether or not workstations have users logged on. Thus, in some cases a message waiting to be serviced might appear or disappear on particular workstation displays as users log on or off of workstations before the message is responded to.

Figure 2:
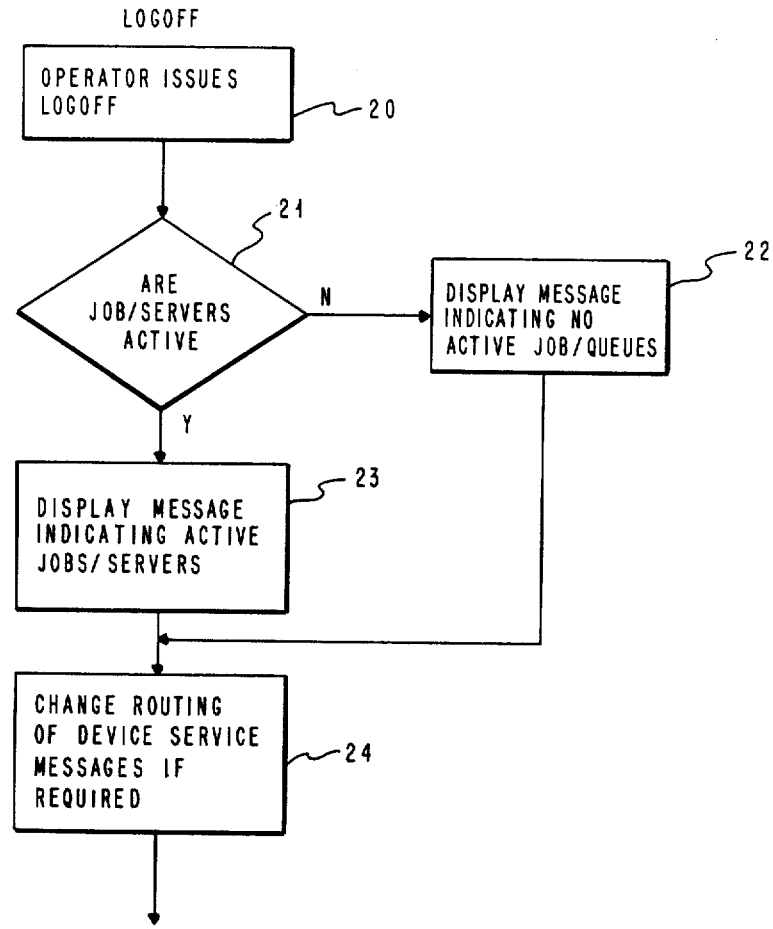
FIG. 2 is a flow diagram showing the logic required when an interactive user logs off.

FIG. 2 shows the steps performed when an interactive user logs off of a workstation, as indicated at block 20. At block 21 the operating system will check to see if there are any servers active or if there are any jobs currently in execution. If not, at block 22 the workstation displays a message indicating that no active jobs or queues remain to be processed. If servers and/or jobs are active, at block 23 a message is displayed on the workstation informing any potential users of that workstation of the activity and not to power off the workstation. This message remains on the display until another interactive user logs onto that workstation or until all resources being utilized at that workstation are released.

Device service messages which would have been routed to the user who just logged off will now be routed to the next option in the device service list. Therefore, as mentioned above, at block 24 a device service table may be set up so that if an operator is present on the server workstation, that operator receives the device service message. Otherwise, it is routed to another specified location.

Figure 3:
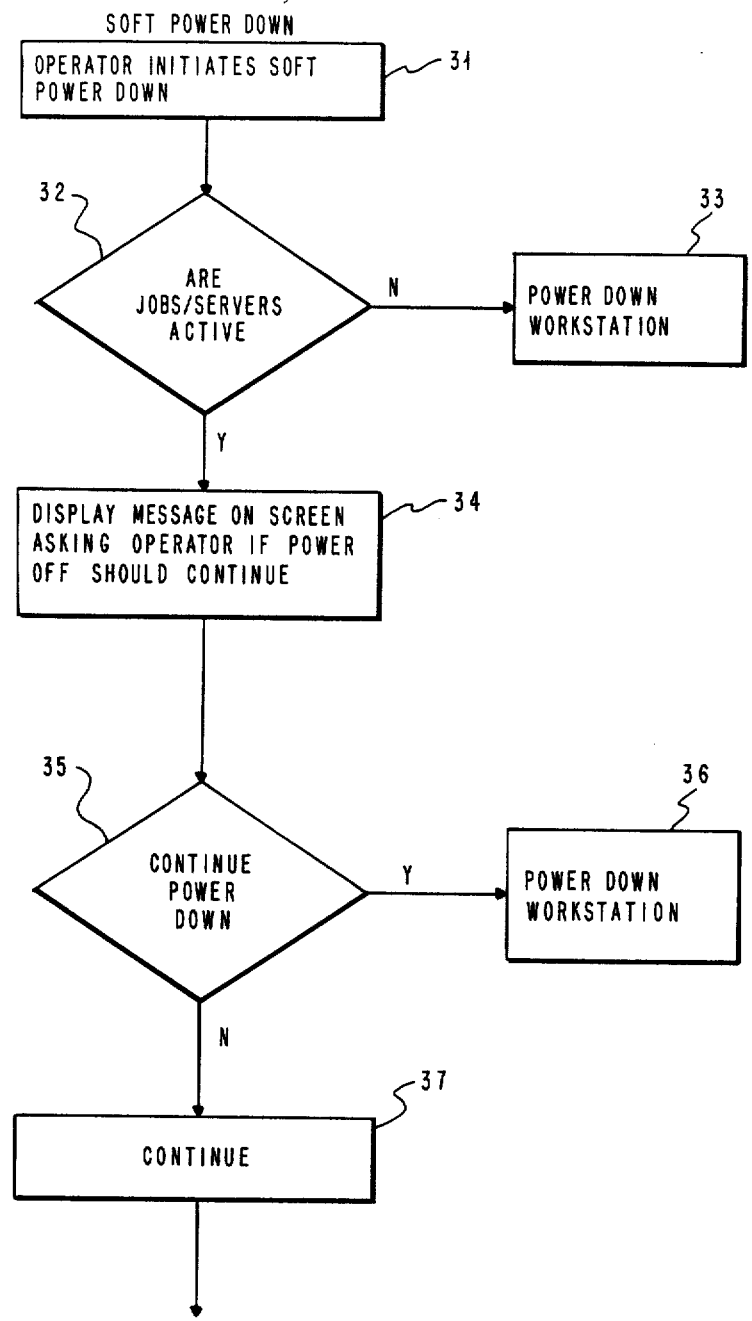
FIG. 3 is a flow diagram showing the logic required to perform soft power down.

FIG. 3 shows the steps performed when a user initiates soft power down, as indicated at block 31. Soft power down can be implemented in one of two ways. First the hardware can be implemented to pass control to the operating system whenever the power off switch is pressed. Or, secondly, a software command can be provided. At block 32 the operating system checks to see if there are any servers active or if there are any jobs currently in execution. If not, at block 33 the power down request is honored. If servers and/or jobs are active, at block 34 the operating system will display a message asking if power off is still requested. At block 35 if the request is continued, all jobs are ended as soon as possible, as indicated at block 36. After all jobs have finished the power is turned off on the workstation. If not requested, at block 37 the workstation continues execution as normal.

This allows the user to queue the activity at a workstation in an orderly fashion with a minimum of actions required by the user. It also prevents the user from inadvertently powering off the workstation when it would cause abnormal termination of jobs.

The following programming design language of Appendix A is another form of the above description of this invention. The listing parallels the operation described above relative to FIGS. 1-3.

IN THE UNITED STATES PATENT AND TRADEMARK OFFICE

In re application of : Before the Examiner:

M. A. Hoflich, et al : Archie E. Williams

Serial No.: 06/568,007 : Group Art Unit: 232

Filed: 01/04/84 : Intellectual Property

Title: WORKSTATION RESOURCE : Law Department

SHARING : International Business

: Machines Corporation

: 11400 Burnet Road

May 18, 1987 : Austin, Texas 78758

AMENDMENT

Honorable Commissioner of Patents and Trademarks

Washington, D.C. 20231

Sir:

In response to the Examiner's Office Action dated January 16, 1987, Paper Number 11, please amend the above-identified application as follows:

IN THE SPECIFICATION:

After page |8, line 35, and before page 9, line 1, insert

The following programming design language of Appendix A is another form of the above description of this invention. The listing parallels the operation described above relative to Figs. 1-3.

APPENDIX A

```
POWER_ON ROUTINE:
/*****************************************************************/
/*  ROUTINE IS CALLED IMMEDIATELY AFTER INITIAL PROGRAM LOAD OF  */
/*  OPERATING SYSTEM                                             */
/*****************************************************************/
/*  DECLARE VARIABLES                                            */
/*****************************************************************/
DECLARE STRUCTURE POWER_ON_PROFILE;
    SERVERS_DESIRED (4);
        BATCH;
        HARDFILE;
        PRINTER;
        COMMUNICATIONS;
    AUTO_INITIATION (4);
        BATCH;
        HARDFILE;
        PRINTER;
        COMMUNICATIONS;
    DEVICE_SERVICE (4);
        BATCH;
        HARDFILE;
        PRINTER;
        COMMUNICATIONS;
DECLARE STRUCTURE SERVER_ACTIVE(4);
        BATCH;
        HARDFILE;
        PRINTER;
        COMMUNICATIONS;
/*****************************************************************/
/*  DETERMINE SERVERS TO BE ACTIVATED AND ACTIVATE AS APPROPRIATE */
```

```
/****************************************************************/
     DO I = 1 TO 4;
         IF SERVERS_DESIRED(I) = "Y" THEN
             CASE (I): BATCH_ROUTINE, HARDFILE_ROUTINE,
                     PRINTER_ROUTINE, COMMUNICATIONS_ROUTINE;
BATCH_ROUTINE:
             CALL START_BATCH(AUTO_INITIATION(I));
             GOTO DO_END;
HARDFILE_ROUTINE:
             CALL START_HARDFILE;
             GOTO DO_END;
PRINTER_ROUTINE:
             CALL START_PRINTER(AUTO_INITIATION(I));
             GOTO DO_END;
COMMUNICATIONS_ROUTINE:
             CALL START_COMMUNICATIONS(AUTO_INITIATION(I));
DO_END: ENDDO;
     GOTO END_POWER_ON;
/****************************************************************/
/*   START BATCH JOB QUEUE                                      */
/****************************************************************/
START_BATCH(AUTO) ROUTINE:
     IF JOB QUEUE DOES NOT EXIST THEN INITIALIZE QUEUE;
     SETUP DEVICE SERVICE REQUEST PARAMETERS;
     IF AUTO = "Y" THEN DO;
         START BATCH QUEUE HANDLER;
         SERVER_ACTIVE(1) = "Y";
     ENDDO;
END_START_BATCH;
/****************************************************************/
/*   SETUP REMOTE FILE ACCESS PROFILES                          */
/****************************************************************/
START_HARDFILE ROUTINE:
     INITIALIZE REMOTE FILE PROFILES;
END_START_HARDFILE;
/****************************************************************/
/*   START PRINTER/PLOTTER SPOOLING/QUEUES                      */
/****************************************************************/
START_PRINTER(AUTO) ROUTINE:
     IF PRINTER QUEUE DOES NOT EXIST THEN INITIALIZE QUEUE;
     SETUP DEVICE SERVICE REQUEST PARAMETERS;
     IF AUTO = "Y" THEN DO;
         START PRINTER SPOOLER;
```

```
            SERVER_ACTIVE(3) = "Y";
        ENDDO;
END_START_PRINTER;
/******************************************************************/
/*   START COMMUNICATIONS APPLICATIONS                            */
/******************************************************************/
START_COMMUNICATIONS(AUTO) ROUTINE:
     IF COMMUNICATIONS QUEUE DOES NOT EXIST THEN INITIALIZE QUEUE;
     SETUP DEVICE SERVICE REQUEST PARAMETERS;
     IF AUTO = "Y" THEN DO;
            START COMMUNICATIONS APPLICATION;
            SERVER_ACTIVE(4) = "Y";
     ENDDO;
END_START_COMMUNICATIONS;
END_POWER_ON;
/******************************************************************/
/******************************************************************/
LOGOFF ROUTINE:
/******************************************************************/
/*   THIS ROUTINE IS CALLED AS PART OF THE LOGOFF PROCEDURE       */
/******************************************************************/
DECLARE STRUCTURE SERVER_ACTIVE(4);
         BATCH;
         HARDFILE;
         PRINTER;
         COMMUNICATIONS;
/******************************************************************/
/*   DETERMINE IF JOB SERVERS ARE ACTIVE AND DISPLAY MESSAGE      */
/******************************************************************/
     ACTIVE = "N";
     DO I = 1 TO 4;
            IF SERVER_ACTIVE(I) = "Y" THEN DO;
                 DISPLAY "XXXXX SERVER ACTIVE".
                 ACTIVE = "Y";
            ENDDO;
        ENDDO;
     IF ACTIVE = "N" THEN
            DISPLAY "NO ACTIVE SERVERS/JOBS";
        IF DEVICE SERVICE SPECIFIED FOR OPERATOR LOGGING OFF THEN
            RESET DEVICE SERVICE REQUEST PARAMETERS;
END_LOGOFF;
/******************************************************************/
/******************************************************************/
```

SOFT_POWER_DOWN ROUTINE:

```
/*******************************************************************/
/*   THIS ROUTINE IS CALLED AS PART OF THE SOFT POWER DOWN PROCEDURE   */
/*******************************************************************/
DECLARE STRUCTURE SERVER_ACTIVE(4);
        BATCH;
        HARDFILE;
        PRINTER;
        COMMUNICATIONS;
/*******************************************************************/
/*   DETERMINE IF JOB SERVERS ARE ACTIVE AND DISPLAY MESSAGE          */
/*******************************************************************/
    ACTIVE = "N";
    DO I = 1 TO 4;
        IF SERVER_ACTIVE(I) = "Y" THEN DO;
            DISPLAY "XXXXX SERVER ACTIVE, DO YOU WANT TO
                    CONTINUE WITH LOGOFF?", ANSWER;
            IF ANSWER NOT= "Y" THEN GOTO POWER_DOWN_CANCEL;
            TERMINATE APPROPRIATE SERVER;
            ACTIVE = "Y";
        ENDDO;
    ENDDO;
    IF ACTIVE = "N" THEN
        DISPLAY "NO ACTIVE SERVERS/JOBS";
    ELSE DISPLAY "XXX ALL ACTIVE SERVERS/JOBS WILL BE TERMINATED";
    IF DEVICE SERVICE SPECIFIED FOR WORKSTATION THEN
        RESET DEVICE SERVICE REQUEST PARAMETERS;
    GOTO END_LOGOFF;
POWER_DOWN_CANCEL:
    SET RETURN CODE TO CANCEL POWER DOWN;
END_LOGOFF;
```

IN THE CLAIMS:

Cancel Claims 2, 7, 10, and 12 and amend Claims 1, 3, 6, 8-9, 11, and 13 as follow:

Claim 1 (Amended)   In a data processing method employing more than one data processing workstation in which workstations are capable of communications [therebetween] therebetween, the improvement for allowing an operator at a first workstation to cause the utilization of one or more resources of a second workstation, comprising:

determining at said first workstation a specification of resources at said second workstation which may be utilized by said first workstation; [and]

displaying at said second workstation, upon said utilization of said resources at said second workstation by said first workstation, an indication of said utilization of said resources[.];

In summary, a technique has been shown to effectively utilize the processor, memory, and I/O resources of a workstation without requiring an operator to be present at that workstation. Additionally, resources of that workstation can be shared with other workstations even if an operator is actively using the workstation containing the resources to be shared. Thus, an operator at a first workstation can cause a queue of jobs to be started at a second workstation, whether or not an operator is logged onto the second workstation, if the second workstation includes sufficient resources to assist in the jobs queued by the operator of the first workstation. The invention provides for the display of messages on affected workstations if the resources of those workstations are being utilized beyond the use by the local, logged on operator. The invention also provides for the display of device service messages in a manner that best assures the attention of an operator assigned to service the device. A routine is also included to require an additional decision by the operator to power down the workstation when resources of the workstation are being utilized by other workstations for active jobs.

While the invention has been shown and described with reference to particular embodiments thereof, it will be understood by those skilled in the art that the foregoing and other changes in form and details may be made therein without departing from the spirit and scope of the invention.

What is claimed is:

1. In a data processing method employing more than one data processing workstation in which workstations communicate therebetween, the improvement for allowing an operator at a first workstation to cause the utilization of one or more resources of a second workstation, comprising:

determining at said first workstation a specification of resources at said second workstation which are authorized for utilization by said first workstation;

displaying at said second workstation, upon actual utilization of one or more of said resources at said second workstation by said first workstation, an indication of said utilization of one or more of said resources;

determining, in the event of an operator logging off said second workstation, if said one or more resources of said second workstation are being utilized by said first workstation; and then displaying an indication at said second workstation that the second workstation should be maintained in an on state because of utilization of said one or more resources of said second workstation by said first workstation.

2. In the data processing method of claim 1 further comprising:

displaying, at a workstation according to said specification of resources and according to whether or not an operator is logged on at said second workstation, a message indicating required operator service for one of said resources at said second workstation.

3. In the data processing method of claim 2 further comprising:

displaying an indication at said second workstation, in the event of required operator service for one of said resources at said second workstation being utilized by said first workstation, and in the event that an operator is logged on at said second workstation, of said required operator service.

4. In the data processing method of claim 3 further comprising:

displaying an indication at a workstation other than said second workstation, in the event of required operator service for one of said resources at said second workstation being utilized by said first workstation, and in the event that an operator is not logged on at said second workstation, of said required operator service.

5. In the data processing method of claim 4 further comprising:

displaying an indication at said first workstation, in the event of required operator service for one of said resources at said second workstation being utilized by said first workstation, and in the event that an operator is not logged on at said second workstation, of said required operator service.

6. In the data processing method of claim 1 further comprising:

displaying at said second workstation, in the event that an operator at said second workstation attempts a soft power down at said workstation while said one or more resources of said second workstation are being utilized by said first workstation, an indication asking the operator if the power down process should continue; and continuing the power down process upon an affirmative response by said operator at said second workstation.

7. In a data processing system employing more than one data processing workstation in which workstations communicate therebetween, the improvement for allowing an operator at a first workstation to cause the utilization of one or more resources of a second workstation, comprising:

means for determining at said first workstation a specification of resources at said second workstation which are authorized for utilization by said first workstation;

means for displaying at said second workstation, upon actual utilization of one or more of said resources at said second workstation by said first workstation, an indication of said utilization of one or more of said resources;

means for determining, in the event of an operator logging off said second workstation, if said one or more resources of said second workstation are being utilized by said first workstation; and means for displaying an indication at said second workstation that the second workstation should be maintained in an on state because of utilization of said one or more resources of said second workstation by said first workstation.

8. In the data processing system of claim 7 further comprising:

means for displaying, at a workstation according to said specification of resources and according to whether or not an operator is logged on at said second workstation, a message indicating required operator service for one of said resources at said second workstation.

9. In the data processing system of claim 7 further comprising:

means for displaying at said second workstation, in the event that an operator at said second workstation attempts a soft power down at said workstation while said one or more resources of said second workstation are being utilized by said first workstation, an indication asking the operator if the power down process should continue; and means for continuing the power down process upon an affirmative response by said operator at said second workstation.

* * * * *

UNITED STATES PATENT AND TRADEMARK OFFICE
CERTIFICATE OF CORRECTION

PATENT NO. : 4,731,750

DATED : March 15, 1988

INVENTOR(S) : Martha A. Hoflich, et al.

It is certified that error appears in the above-identified patent and that said Letters Patent is hereby corrected as shown below:

Columns 5-14 should be deleted and replaced with attached columns 5-16.

Signed and Sealed this

Ninth Day of February, 1993

Attest:

STEPHEN G. KUNIN

Attesting Officer

Acting Commissioner of Patents and Trademarks the interactive user. Thus, at block 7 a message is displayed at a second workstation having resources utilized by a first workstation, whether or not an operator is logged onto the second workstation. The message will instruct anyone at the second workstation not to turn off that workstation. The message will also indicate whether or not an operator is logged onto the second workstation.

Some devices which may be shared, in particular, a printer (and less frequently, diskette drives), may require service or operator attention when in use. At block 8 as long as no device service is required the jobs are executed as described above. In the event it is necessary to post a message regarding required device service, at block 9 a profile associated with each server is addressed which specifies the device service message routing. This profile may specify, but is not limited to, the workstation that owns the resource, the user that initiated the job, a particular user, or broadcast to all powered on workstations. More than one option may be specified. If the first option does not provide service for the device, the second and succeeding options will be tried until all options are exhausted. The operating system then returns to the first option in a continuing attempt to communicate to an appropriate operator the requirement for device service. It is important to note that the message routing routine is responsive to whether or not workstations have users logged on. Thus, in some cases a message waiting to be serviced might appear or disappear on particular workstation displays as users log on or off of workstations before the message is responded to.

FIG. 2 shows the steps performed when an interactive user logs off of a workstation, as indicated at block 20. At block 21 the operating system will check to see if there are any servers active or if there are any jobs currently in execution. If not, at block 22 the workstation displays a message indicating that no active jobs or queues remain to be processed. If servers and/or jobs are active, at block 23 a message is displayed on the workstation informing any potential users of that workstation of the activity and not to power off the workstation. This message remains on the display until another interactive user logs onto that workstation or until all resources being utilized at that workstation are released.

Device service messages which would have been routed to the user who just logged off will now be routed to the next option in the device service list. Therefore, as mentioned above, at block 24 a device service table may be set up so that if an operator is present on the server workstation, that operator receives the device service message. Otherwise, it is routed to another specified location.

FIG. 3 shows the steps performed when a user initiates soft power down, as indicated at block 31. Soft power down can be implemented in one of two ways. First the hardware can be implemented to pass control to the operating system whenever the power off switch is pressed. Or, secondly, a software command can be provided. At block 32 the operating system checks to see if there are any servers active or if there are any jobs currently in execution. If not, at block 33 the power down request is honored. If servers and/or jobs are active, at block 34 the operating system will display a message asking if power off is still requested. At block 35 if the request is continued, all jobs are ended as soon as possible, as indicated at block 36. After all jobs have finished the power is turned off on the workstation. If not requested, at block 37 the workstation continues execution as normal.

This allows the user to queue the activity at a workstation in an orderly fashion with a minimum of actions required by the user. It also prevents the user from inadvertently powering off the workstation when it would cause abnormal termination of jobs.

The following programming design language of Appendix A is another form of the above description of this invention. The listing parallels the operation described above relative to FIGS. 1-3.

APPENDIX A

```
POWER_ON ROUTINE:
/****************************************************************/
/*  ROUTINE IS CALLED IMMEDIATELY AFTER INITIAL PROGRAM LOAD OF  */
/*  OPERATING SYSTEM                                             */
/****************************************************************/
/*  DECLARE VARIABLES                                            */
/****************************************************************/
DECLARE STRUCTURE POWER_ON_PROFILE;
    SERVERS_DESIRED (4);
        BATCH;
        HARDFILE;
        PRINTER;
        COMMUNICATIONS;
```

```
            AUTO_INITIATION (4);
                BATCH;
                HARDFILE;
                PRINTER;
                COMMUNICATIONS;
            DEVICE_SERVICE (4);
                BATCH;
                HARDFILE;
                PRINTER;
                COMMUNICATIONS;
        DECLARE STRUCTURE SERVER_ACTIVE(4);
                BATCH;
                HARDFILE;
                PRINTER;
                COMMUNICATIONS;
        /****************************************************************/
        /*   DETERMINE SERVERS TO BE ACTIVATED AND ACTIVATE AS APPROPRIATE  */
        /****************************************************************/
            DO I = 1 TO 4;
                IF SERVERS_DESIRED(I) = "Y" THEN
                    CASE (I): BATCH_ROUTINE, HARDFILE_ROUTINE,
                              PRINTER_ROUTINE, COMMUNICATIONS_ROUTINE;
        BATCH_ROUTINE:
                    CALL START_BATCH(AUTO_INITIATION(I));
                    GOTO DO_END;
        HARDFILE_ROUTINE:
                    CALL START_HARDFILE;
                    GOTO DO_END;
        PRINTER_ROUTINE:
                    CALL START_PRINTER(AUTO_INITIATION(I));
                    GOTO DO_END;
        COMMUNICATIONS_ROUTINE:
                    CALL START_COMMUNICATIONS(AUTO_INITIATION(I));
        DO_END: ENDDO;
            GOTO END_POWER_ON;
        /****************************************************************/
        /*   START BATCH JOB QUEUE                                        */
        /****************************************************************/
        START_BATCH(AUTO) ROUTINE:
            IF JOB QUEUE DOES NOT EXIST THEN INITIALIZE QUEUE;
            SETUP DEVICE SERVICE REQUEST PARAMETERS;
            IF AUTO = "Y" THEN DO;
```

```
            START BATCH QUEUE HANDLER;
            SERVER_ACTIVE(1) = "Y";
        ENDDO;
END_START_BATCH;
/**********************************************************************/
/*  SETUP REMOTE FILE ACCESS PROFILES                                  */
/**********************************************************************/
START_HARDFILE ROUTINE:
        INITIALIZE REMOTE FILE PROFILES;
END_START_HARDFILE;
/**********************************************************************/
/*  START PRINTER/PLOTTER SPOOLING/QUEUES                              */
/**********************************************************************/
START_PRINTER(AUTO) ROUTINE:
        IF PRINTER QUEUE DOES NOT EXIST THEN INITIALIZE QUEUE;
        SETUP DEVICE SERVICE REQUEST PARAMETERS;
        IF AUTO = "Y" THEN DO;
            START PRINTER SPOOLER;
            SERVER_ACTIVE(3) = "Y";
        ENDDO;
END_START_PRINTER;
/**********************************************************************/
/*  START COMMUNICATIONS APPLICATIONS                                  */
/**********************************************************************/
START_COMMUNICATIONS(AUTO) ROUTINE:
        IF COMMUNICATIONS QUEUE DOES NOT EXIST THEN INITIALIZE QUEUE;
        SETUP DEVICE SERVICE REQUEST PARAMETERS;
        IF AUTO = "Y" THEN DO;
            START COMMUNICATIONS APPLICATION;
            SERVER_ACTIVE(4) = "Y";
        ENDDO;
END_START_COMMUNICATIONS;
END_POWER_ON;
/**********************************************************************/
/**********************************************************************/
LOGOFF ROUTINE:
/**********************************************************************/
/*  THIS ROUTINE IS CALLED AS PART OF THE LOGOFF PROCEDURE             */
/**********************************************************************/
DECLARE STRUCTURE SERVER_ACTIVE(4);
        BATCH;
        HARDFILE;
        PRINTER;
        COMMUNICATIONS;
```

```
/*********************************************************************/
/*  DETERMINE IF JOB SERVERS ARE ACTIVE AND DISPLAY MESSAGE          */
/*********************************************************************/
      ACTIVE = "N";
      DO I = 1 TO 4;
         IF SERVER_ACTIVE(I) = "Y" THEN DO;
             DISPLAY "XXXXX SERVER ACTIVE".
             ACTIVE = "Y";
         ENDDO;
      ENDDO;
      IF ACTIVE = "N" THEN
          DISPLAY "NO ACTIVE SERVERS/JOBS";
      IF DEVICE SERVICE SPECIFIED FOR OPERATOR LOGGING OFF THEN
          RESET DEVICE SERVICE REQUEST PARAMETERS;
END_LOGOFF;
/*********************************************************************/
/*********************************************************************/
SOFT_POWER_DOWN ROUTINE:
/*********************************************************************/
/*  THIS ROUTINE IS CALLED AS PART OF THE SOFT POWER DOWN PROCEDURE  */
/*********************************************************************/
DECLARE STRUCTURE SERVER_ACTIVE(4);
        BATCH;
        HARDFILE;
        PRINTER;
        COMMUNICATIONS;
/*********************************************************************/
/*  DETERMINE IF JOB SERVERS ARE ACTIVE AND DISPLAY MESSAGE          */
/*********************************************************************/
      ACTIVE = "N";
      DO I = 1 TO 4;
         IF SERVER_ACTIVE(I) = "Y" THEN DO;
             DISPLAY "XXXXX SERVER ACTIVE, DO YOU WANT TO
                      CONTINUE WITH LOGOFF?", ANSWER;
             IF ANSWER NOT= "Y" THEN GOTO POWER_DOWN_CANCEL;
             TERMINATE APPROPRIATE SERVER;
             ACTIVE = "Y";
         ENDDO;
      ENDDO;
      IF ACTIVE = "N" THEN
          DISPLAY "NO ACTIVE SERVERS/JOBS";
          ELSE DISPLAY "XXX ALL ACTIVE SERVERS/JOBS WILL BE TERMINATED";
      IF DEVICE SERVICE SPECIFIED FOR WORKSTATION THEN
          RESET DEVICE SERVICE REQUEST PARAMETERS;
      GOTO END_LOGOFF;
```

```
    GOTO END_LOGOFF;
POWER_DOWN_CANCEL:
    SET RETURN CODE TO CANCEL POWER DOWN;
END LOGOFF;
```

In summary, a technique has been shown to effectively utilize the processor, memory, and I/O resources of a workstation without requiring an operator to be present at that workstation. Additionally, resources of that workstation can be shared with other workstations even if an operator is actively using the workstation containing the resources to be shared. Thus, an operator at a first workstation can cause a queue of jobs to be started at a second workstation, whether or not an operator is logged onto the second workstation, if the second workstation includes sufficient resources to assist in the jobs queued by the operator of the first workstation. The invention provides for the display of messages on affected workstations if the resources of those workstations are being utilized beyond the use by the local, logged on operator. The invention also provides for the display of device service messages in a manner that best assures the attention of an operator assigned to service the device. A routine is also included to require an additional decision by the operator to power down the workstation when resources of the workstation are being utilized by other workstations for active jobs.

While the invention has been shown and described with reference to particular embodiments thereof, it will be understood by those skilled in the art that the foregoing and other changes in form and details may be made therein without departing from the spirit and scope of the invention.

What is claimed is:

1. In a data processing method employing more than one data processing workstation in which workstations communicate therebetween, the improvement for allowing an operator at a first workstation to cause the utilization of one or more resources of a second workstation, comprising:
   determining at said first workstation a specification of resources at said second workstation which are authorized for utilization by said first workstation;
   displaying at said second workstation, upon actual utilization of one or more of said resources at said second workstation by said first workstation, an indication of said utilization of one or more of said resources;
   determining, in the event of an operator logging off said second workstation, if said one or more resources of said second workstation are being utilized by said first workstation; and then
   displaying an indication at said second workstation that the second workstation should be maintained in an on state because of utilization of said one or more resources of said second workstation by said first workstation.

2. In the data processing method of claim 1 further comprising:
   displaying, at a workstation according to said specification of resources and according to whether or not an operator is logged on at said second workstation, a message indicating required operator service for one of said resources at said second workstation.

3. In the data processing method of claim 2 further comprising:
   displaying an indication at said second workstation, in the event of required operator service for one of said resources at said second workstation being utilized by said first workstation, and in the event that an operator is logged on at said second workstation, of said required operator service.

4. In the data processing method of claim 3 further comprising:
   displaying an indication at a workstation other than said second workstation, in the event of required operator service for one of said resources at said second workstation being utilized by said first workstation, and in the event that an operator is not logged on at said second workstation, of said required operator service.

5. In the data processing method of claim 4 further comprising:
   displaying an indication at said first workstation, in the event of required operator service for one of said resources at said second workstation being utilized by said first workstation, and in the event that an operator is not logged on at said second workstation, of said required operator service.

6. In the data processing method of claim 1 further comprising:
   displaying at said second workstation, in the event that an operator at said second workstation attempts a soft power down at said workstation while said one or more resources of said second workstation are being utilized by said first workstation, an indication asking the operator if the power down process should continue; and
   continuing the power down process upon an affirmative response by said operator at said second workstation.

7. In a data processing system employing more than one data processing workstation in which workstations communicate therebetween, the improvement for allowing an operator at a first workstation to cause the utilization of one or more resources of a second workstation, comprising:
   means for determining at said first workstation a specification of resources at said second workstation which are authorized for utilization by said first workstation;
   means for displaying at said second workstation, upon actual utilization of one or more of said resources at said second workstation by said first workstation, an indication of said utilization of one or more of said resources;
   means for determining, in the event of an operator logging off said second workstation, if said one or more resources of said second workstation are being utilized by said first workstation; and
   means for displaying an indication at said second workstation that the second workstation should be maintained in an on state because of utilization of said one or more resources of said second workstation by said first workstation.

8. In the data processing system of claim 7 further comprising:
means for displaying, at a workstation according to said specification of resources and according to whether or not an operator is logged on at said second workstation, a message indicating required operator service for one of said resources at said second workstation.

9. In the data processing system of claim 7 further comprising:
means for displaying at said second workstation, in the event that an operator at said second workstation attempts a soft power down at said workstation while said one or more resources of said second workstation are being utilized by said first workstation, an indication asking the operator if the power down process should continue; and
means for continuing the power down process upon an affirmative response by said operator at said second workstation.

* * * * *